(12) United States Patent
Masselle et al.

(10) Patent No.: US 9,466,128 B2
(45) Date of Patent: Oct. 11, 2016

(54) DISPLAY OF PHOTOGRAPHIC ATTRIBUTES RELATED TO A GEOGRAPHIC LOCATION

(71) Applicant: GLOBALFOUNDRIES INC., Grand Cayman (KY)

(72) Inventors: Eric L. Masselle, Raleigh, NC (US); Andrew L. Schirmer, Andover, MA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 164 days.

(21) Appl. No.: 13/868,150

(22) Filed: Apr. 23, 2013

(65) Prior Publication Data

US 2014/0313219 A1   Oct. 23, 2014

(51) Int. Cl.
  *G06T 11/00* (2006.01)
  *G06T 3/40* (2006.01)

(52) U.S. Cl.
  CPC ............. *G06T 11/00* (2013.01); *G06T 3/4038* (2013.01)

(58) Field of Classification Search
  CPC .............................. G06T 11/00; G01C 21/20
  See application file for complete search history.

(56) References Cited

U.S. PATENT DOCUMENTS

| | | | |
|---|---|---|---|
| 6,282,362 B1 | 8/2001 | Murphy et al. | |
| 7,408,137 B2 | 8/2008 | Sawachi | |
| 7,840,344 B2 | 11/2010 | Sloo | |
| 8,248,503 B2 | 8/2012 | Sogoh et al. | |
| 2006/0001757 A1* | 1/2006 | Sawachi | 348/333.12 |
| 2009/0040370 A1 | 2/2009 | Varanasi | |
| 2009/0154761 A1 | 6/2009 | Goh et al. | |
| 2010/0060739 A1 | 3/2010 | Salazar | |
| 2011/0157396 A1* | 6/2011 | Kotani | 348/222.1 |
| 2011/0187716 A1* | 8/2011 | Chen et al. | 345/427 |
| 2011/0320116 A1 | 12/2011 | DeMaio et al. | |
| 2014/0043436 A1* | 2/2014 | Bell et al. | 348/46 |
| 2015/0116360 A1* | 4/2015 | Jones | G06T 11/60 345/634 |

OTHER PUBLICATIONS

"Google Earth", released by Google Inc., in 2008. https://www.google.com/earth/.*
"Autodesk—Wikipedia, the free encyclopedia," <http://en.wikipedia.org/w/index.php?title=Autodesk&oldid=484400935>, Mar. 28, 2012, retrieved from the Internet Jan. 22, 2013.

(Continued)

*Primary Examiner* — Xiao Wu
*Assistant Examiner* — Chong Wu
(74) *Attorney, Agent, or Firm* — Scully Scott Murphy and Presser; Frank Digiglio

(57) ABSTRACT

A display is created relating to photography done by a camera. A first coverage zone is determined for at least one of the following: a current photograph, or a first past photograph. A data set is generated corresponding to the display, with the display including at least a portion of the first coverage zone. At least the determining step is performed by at least one processor.

14 Claims, 7 Drawing Sheets

(56) References Cited

OTHER PUBLICATIONS

"Autodesk—Film—Avatar," <http://usa.autodesk.com/adsk/servlet/item?id=14270942&siteID=123112>, retrieved from the internet Jan. 22, 2013, © Copyright 2013 Autodesk, Inc.
"Avatar presentation at Autodesk University," Uploaded on Feb. 4, 2010, <http://www.youtube.com/watch?v=HmPitTWKudl>, retrieved from the Internet Jan. 22, 2013.
Camera Display Cone—Google Search—this search is mentioned because it brought up no relavent results, <http://www.google.com/search?q=nikon+hyperfocal+display&ie=utf-8&oe=utf-8&aq=t&rls=org.mozilla:en-US: official&client=firefox-a#hl=en&client=firefox-a&rls=org.mozilla:en-US%3Aofficial&sclient=psy-ab&q=camera+display+cone&oq=camera+display+cone&gs_l=serp.3..0i8i10i30.4866.12384.0.16423.41.36.0.0.0.2.397.6856.0j18j14j2.36.0.les%3Beqn%2Ccconf%3D1-0%2Cmin_length%3D2%2Crate_low%3D0-025%2Crate_high%3D0-025%.
"Dep," <http://www.luminous-landscape.com/tutorials/dep.shtml>, retrieved from the internet Jan. 21, 2013.
"Displaying Camera Information," <http://softimage.wiki.softimage.com/xsidocs/cam_cameras_DisplayingCameraInformation.htm>, retrieved from the Internet Jan. 22, 2013.
"Mapstagram: Mapping Instagram Photos in Real-Time," <http://www.mapstagram.com/> Map data © 2013 Google, INEGI, Inav/Geosistemas SRL, MapLink.

* cited by examiner

DISPLAY OF PHOTOGRAPHIC ATTRIBUTES RELATED TO A GEOGRAPHIC LOCATION

FIELD OF THE INVENTION

The present invention relates generally to the fields of photography and cartography, and more particularly to the display of photographic metadata, including real-time photographic metadata on a geographic map.

BACKGROUND OF THE INVENTION

Photographic images are sometimes communicated and/or presented in conjunction with geographic data relating to the photographic image. For example, it is known to encode photographs into image files including geographic location metadata, such as Global Positioning System (GPS) information denoting the location at which the corresponding photographic image was photographed. As a further example, it is known to display a geographic map having dots that respectively correspond to locations from which photographs have been taken. An example of this is shown in U.S. Pat. No. 8,248,503.

SUMMARY

According to an aspect of the present invention, there is a method of creating a display relating to photography done by a camera. The method includes determining a first coverage zone for a least one of the following: a current photograph, or a first past photograph; and generating a data set corresponding to the display, with the display including at least a portion of the first coverage zone. At least the determining step is performed by at least one processor.

DETAILED DESCRIPTION

Figure 1:
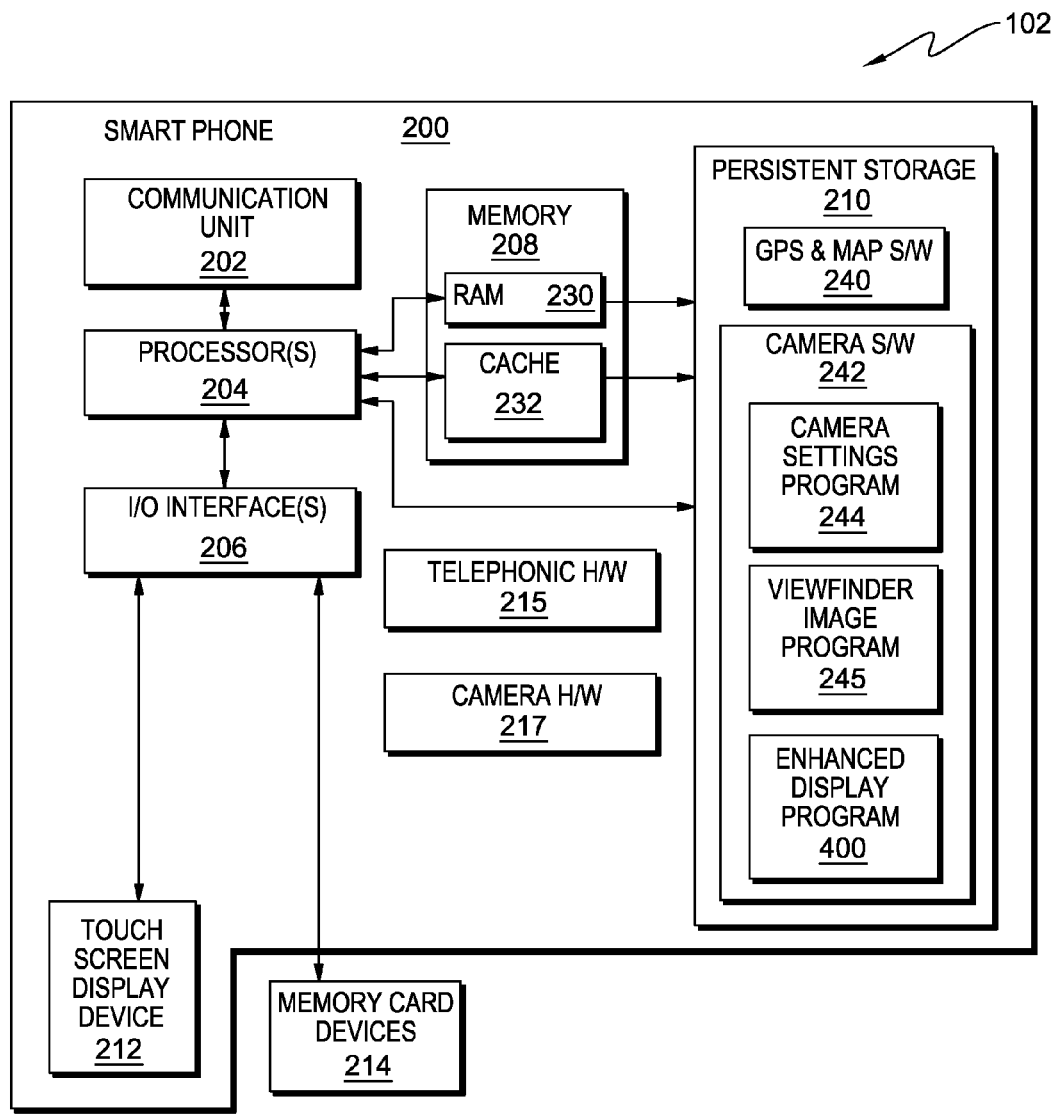
FIG. 1 is a schematic view of a first embodiment of a smart phone (with camera) system according to the present invention.

The DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. THE HARDWARE AND SOFTWARE ENVIRONMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The hardware and software environment for an embodiment of the present invention will now be described in detail with reference to the Figures. FIG. 1 is a functional block diagram of smart phone system 102, including: smart phone 200; communication unit 202; processor(s) 204; memory component 208; RAM (random access memory) component 230; cache 232; persistent storage component 210; GPS and maps software 240; camera software 242; camera settings program 244; viewfinder image program 245; enhanced display program 400; I/O (input/output) interface(s) 206; touch screen display device 212; memory card devices 214; telephonic hardware 215; and camera hardware 217.

Camera software 242 and its various constituent modules implement a real-time geographic photo coverage map according to an embodiment of the present invention. This will be discussed in detail in the next sub-section of this DETAILED DESCRIPTION section. For the rest of this sub-section, the hardware and software environment, in which camera software 242 operates, will be discussed in detail.

In many respects, smart phone system 102 is representative of the various computer systems of the present invention. Various components of smart phone system will be discussed in the following paragraphs.

While smart phone system 102 is used herein as a representative and explanatory embodiment, a computer system of the present invention may alternatively be a laptop computer, tablet computer, netbook computer, personal computer (PC), a desktop computer, a personal digital assistant (PDA), or any programmable electronic device capable of communicating with the client sub-systems via a network. Camera software 242 is a collection of machine readable instructions and data that is used to manage and control smart phone system 102.

It should be appreciated that FIG. 1 provides only an illustration of one implementation (that is, system 102) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Smart phone system 102 is shown as a block diagram with many double arrows. These double arrows (no separate reference numerals) represent a communications fabric, which provides communications between various components of system 102 as shown in the figure. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) memory card device(s) 214 may be able to supply, some or all, memory for system 102; and/or (ii) devices external to system 102 may be able to provide memory for system 102.

Camera software 242 (representative of the various software of system 102, whether or not separately shown in block form in FIG. 1) is stored in persistent storage 210 for access and/or execution by one or more of the respective computer processor(s) 204, usually through one or more memories of memory 208. Persistent storage 210 is at least more persistent than a signal in transit is, but the persistent storage may, of course, be substantially less persistent than permanent storage. Software 242 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information. Some embodiments of the present invention rely on software-based logic in persistent storage 210, but the logic may be found in the form of hardware and/or firmware as will be understood by those of skill in the art. The various functions and software components of software 242 will be explained in more detail, below, in the Operation of Embodiment of the Present Invention sub-section of this DETAILED DESCRIPTION section.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to system 102, such as a cloud storage system and a network enabled camera sub-system. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with smart phone 200. For example, I/O interface 206 provides a connection to memory card device set 214. While a smart phone system typically includes user input devices built into the main body of the smart phone, other types of computer systems may have an external device set that typically includes devices such as a keyboard, keypad, a touch screen, and/or some other suitable input device. Memory card device set 214 can also include portable computer-readable storage media such as, for example, thumb drives, portable optical or magnetic disks, and memory cards. Software and data used to practice embodiments of the present invention, for example, camera program 242, can be stored on such portable computer-readable storage media. In these embodiments the relevant software may (or may not) be loaded, in whole or in part, onto persistent storage device 210 via I/O interface(s) 206. I/O interface(s) 206 also connects in data communication with touch screen display device 212.

Display device 212 provides a mechanism to display data to a user and takes the form of a touchscreen smart phone display screen. Alternatively, the software of the present invention may be (in whole or in part) present in, and executed by, a laptop or desktop computer which has a traditional non-touch-screen display, such as a traditional computer monitor. In that type of embodiment, user input devices (for example, push buttons, keyboard, mouse) may be provided independently of the display.

Memory card devices 214 is any type of removable memory device (now known or to be developed in the future) that can be used to store data in a smart phone system. Currently conventional examples of memory cards (and/or other types of removable storage devices) include SD (secure digital) cards; USB (universal serial bus) connectable data storage devices; and micro SD cards.

Telephonic hardware 215 works with software (not separately shown) so that smart phone 200 operates as a telephone, as is currently conventional.

Camera hardware 217 works with camera software 242 so that smart phone 200 can operate as a still camera and also as a video camera. To some extent, the operation of a smart phone is conventional. However, certain novel and inventive aspects of the camera operations of smart phone 200 will be discussed in detail, below, in the Operation Of Embodiment(s) of the Present Invention sub-section of this DETAILED DESCRIPTION section. Alternatively, in some embodiments, the camera hardware will be in a separate device from: (i) processor(s) 204; and (ii) at least a portion of software 210, 240. In these embodiments, where the camera is separate from the data processing device: (i) the camera may be required to be in data communication with the data processing device (for example, real time communication); and/or (ii) the camera may still have some processing power, display capability, user input capability, etc. (in addition to the capabilities provided by the data processing device).

It should be understood that the present invention is not necessarily limited to smart phone systems. A smart phone system is just one example of a camera where the present invention may be practiced. Other camera systems, including video camera systems, may practice this invention. For example, focus and photograph coverage play significant roles in the set up and use of surveillance cameras.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. OPERATION OF EMBODIMENT(S) OF THE PRESENT INVENTION

Figure 2A:
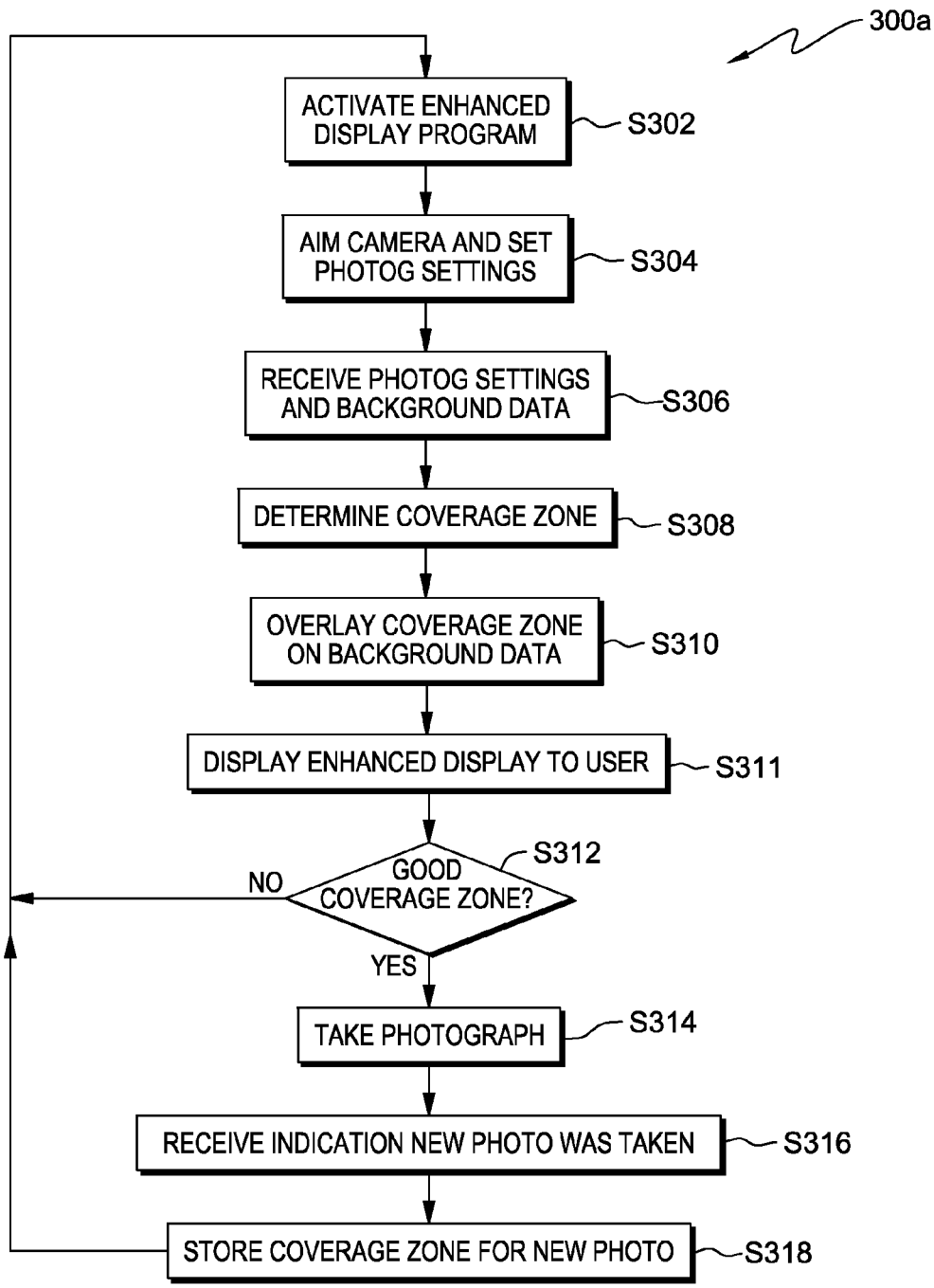
FIG. 2A is a flowchart showing a first process according to an embodiment of the present invention.

FIG. 2A is a flowchart depicting process 300a according to an embodiment of the present invention. Various steps of process 300a will now be discussed in turn.

Figure 3:
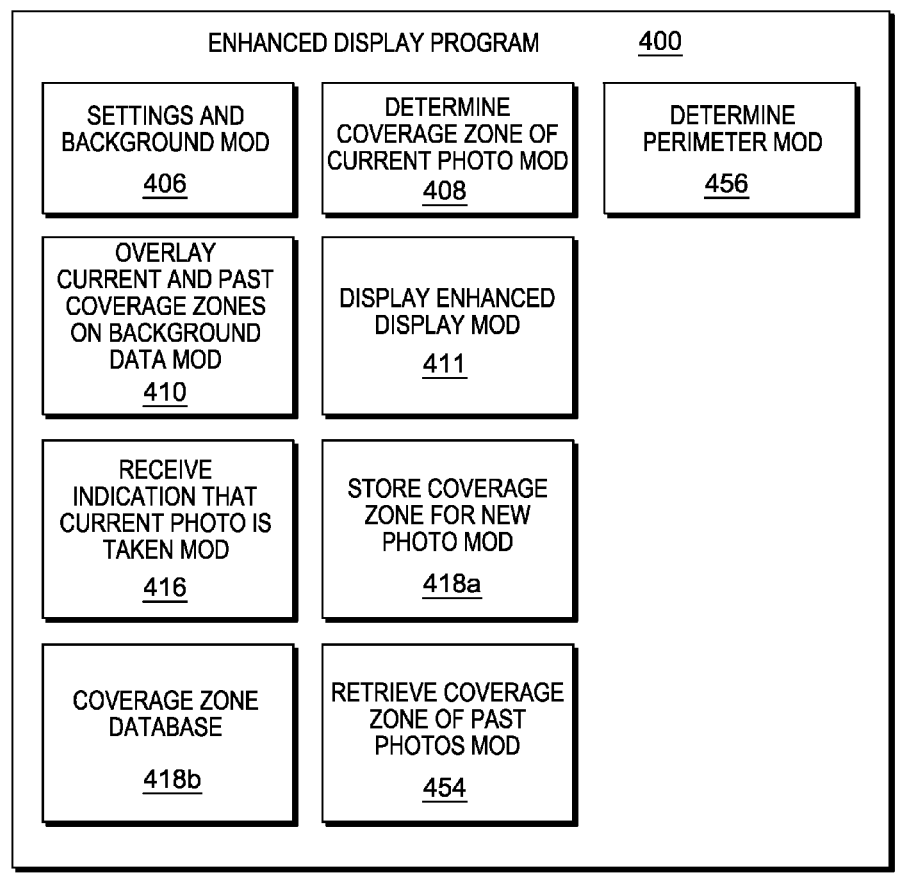
FIG. 3 is a schematic view of control software portion of the first embodiment smart phone system.

Process 300a begins at step S302, where user input activates enhanced display program 400 (see FIGS. 1 and 3). Alternatively, enhanced display program 400 may be activated automatically by software (for example, automatic activation upon occurrence of a predetermined precondition). The user generally activates the enhanced display program because she is concerned with one or more aspects of her photographic coverage.

Relevant aspects of "coverage" may include the following: (i) the framing (and also frame motion for a video shot); (ii) the focus, depth of focus and other aspects of focus; (iii) objects shown in a photograph (for example, a brick wall blocking a scenic mountain lying behind the wall); (iv) coverage as it relates to geographic features of the type shown on maps; and (v) coverage area of a set of photographs, or video segments, taken in the past (for example, when a photographer recreates a shoot previously performed at an earlier date). Process 300a can potentially be helpful with respect to any of these aspects of coverage with respect to a photograph that has not yet been taken. Process 300b (to be discussed later on in this sub-section) can potentially be helpful with respect to at least aspect (v).

Process 300a proceeds to step S304, where the user aims the camera and sets the camera settings in preparation to take a photograph. A user generally holds the camera in her hands to manually aim the camera, especially when using the camera of a smart phone. The present invention is not limited to that general case. For example, the camera may be mounted on a tripod and aimed by the user. For another example, the camera may be mounted on a vehicle and also may be aimed by a remote device.

Camera settings (also called photograph settings or photo settings) for a particular photograph are selected by the user (for example, manual focus), the camera software (for example, auto-focus) or some combination of the two. In the case of a smart phone camera, many camera settings are controlled by camera settings program 244, but some programmed options may be available to the user, such as landscape and portrait settings. The user generally controls the zoom feature, but camera settings program 244 generally maintains the upper and lower limits of the zoom feature. As will be understood by those of skill in the photography arts, focus can be an especially important setting, and many focus-related concepts have been developed, such as near focus, focal depth, infinite focus, hyper-focus and so on. In some embodiments of the present invention, the focus settings will play an important role, as will be explained below.

Process 300a proceeds to step S306, where settings and background module 406 receives (i) photograph settings from camera settings program 244 (see FIG. 1) and (ii) background data inputs for the user interface display from viewfinder image program 245 (see FIG. 1).

With respect to the photograph settings received at step S306, some of these photograph settings are established in step S304 by a user through camera settings program 244 (see FIG. 1), but other settings are fixed by the camera and/or lens type (which, when applicable, may be determined automatically by program 244 or input by a user through program 244). In addition to focus settings, mentioned above, other camera settings set by the user may include: (i) camera's location; (ii) camera height above ground; (iii) direction camera is pointing in the horizontal plane; (iv) angle that camera is pointed to tilt up or down from the horizontal plane; (v) lens angle (for example, wide angle lens); (vi) aperture speed; (vii) aperture diameter; (viii) image sensor size; (ix) film speed; (x) special effects (for example, black and white, chromatic filter, artistic image distortion, time lapse photography, etc.); and/or (xi) frame shape (square, rectangle, circular). Some settings, like camera placement (for example, camera location, camera angle, and camera tilt), is always, or at least almost always, controlled by the photographer. Other photographic settings, like frame shape control are usually not available to the user. Ultimately, the identity of the variable photograph settings will largely, but not necessarily entirely, depend upon what kind of camera a user is working with.

With respect to the background data received at step S306, background data may constitute or include: (i) "symbolic maps" (see Definitions sub-section, below, of this DETAILED DESCRIPTION section); (ii) past literal image of real-world location according to a top down orthographic view (for example, a satellite photo taken in the past); (iii) past literal image of real-world location according to 3D, or perspective, view (for example, a photograph taken in the past from a spatial and geographic perspective similar to the camera's current perspective); (iv) present (or current) literal image of real-world location according to a top down orthographic view (for example, a satellite photo taken in real time); (v) present (or current) literal image of real-world location according to a perspective view (for example, a conventional viewfinder view); and/or (vi) overlaid, layered views including combinations of the foregoing types of backgrounds. GPS and maps software 240 (see FIG. 1) provides symbolic map data to settings and background mod 406 (see FIG. 3). In some embodiments, the GPS software is in communication with a network (not shown), such as: (i) the internet; (ii) local area network; or (iii) cloud network. Symbolic map data may include: (i) symbolic representations of roads and/or trails; (ii) labeled areas of interest often denoted by a color scheme, such as blue for a body of water and green for a park; (iii) public buildings; and/or (iv) commercial areas. GPS and maps software 240 further provides camera orientation information to background mod 406.

Process 300a proceeds to step S308, where module 408 associates the camera settings with a "coverage zone" for the photograph that is about to be taken (that is, the "current photograph"). "Coverage zone" is defined, below, in the definitions sub-section of this DETAILED DESCRIPTION section. While the nature and scope of the coverage zone can vary widely from embodiment to embodiment, a coverage zone is designed to give a photographer some idea of what surface(s) and/or space(s) a photograph will cover, or cover with great clarity. Some embodiments will have more accurate, or precise, coverage zones than other embodiments. Some embodiments will have more expansive coverage zones than others (even with respect to similar photographs (already-taken photographs or merely contemplated photographs)). Some embodiments of the present invention may even allow a photographer to choose what the coverage zone is and/or the manner in which the coverage zone is determined. Several examples of coverage zones will be shown and/or discussed in more detail below.

Process 300a proceeds to step S310, where data module 410 overlays the current photograph's coverage zone (determined at step S308) on corresponding background data (determined at step S306) to create a set of display data. The overlay module creates the display data set corresponding to a single scaled display including: (i) a representation of at least one coverage zone (that is, coverage zone of the currently planned photograph) and: (ii) the background (for example, a symbolic map of the local geography). The display may include other things, like camera settings data and/or coverage zones of previous photographs.

Process 300a proceeds to step S311, where module 411 displays, on a display device (for example, the smart phone's touch screen), the display data set created at step S310, which is shown in graphical form in the illustrated instance.

Figure 4A:
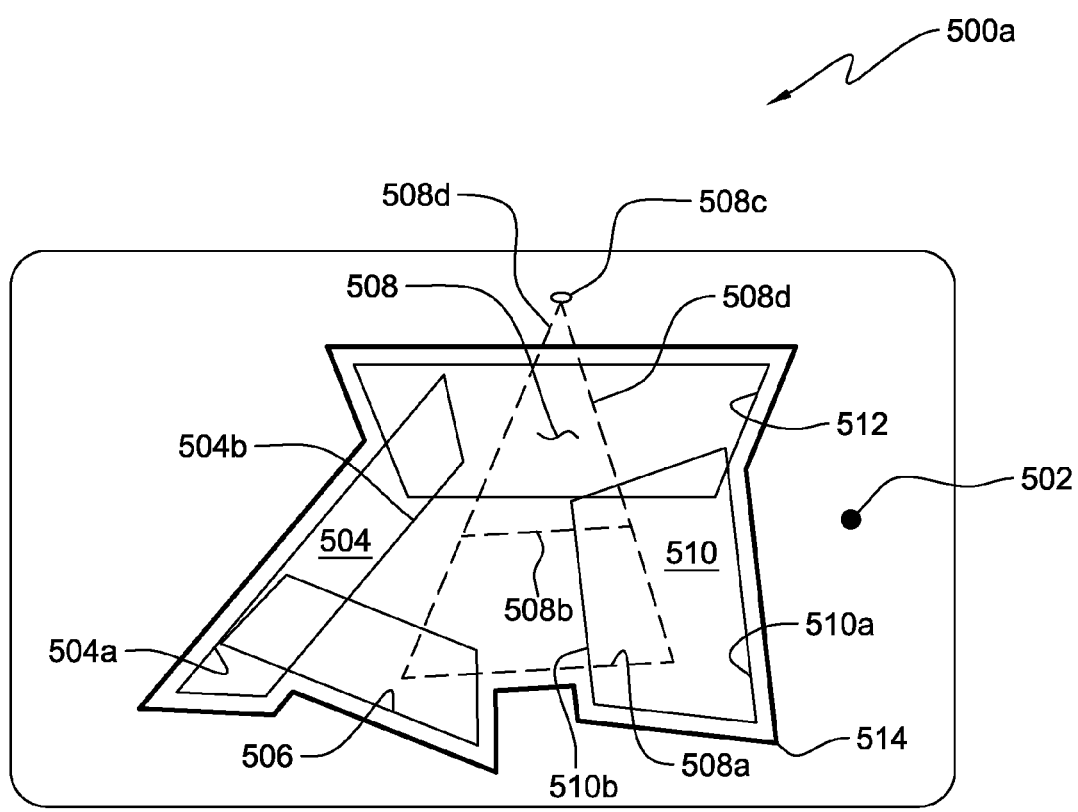
FIG. 4A is a first screenshot, generated by the first embodiment smart phone system, depicting a two-dimensional coverage zone of a photograph about to be taken.

FIG. 4A shows example display 500a including: background display portion 502; previous coverage zones (sometimes referred to as past coverage zones) 504, 506, 510, 512; current coverage zone 508 (shown in dashed lines); and perimeter 514. Background 502 is shown as blank in FIG. 4A for clarity of illustration purposes, but it should generally be understood that there would usually be some type of background such as a symbolic map or a satellite photo.

Previous coverage zone 504 is in the shape of a trapezoid and includes far focal side 504a and near focal side 504b (with the area covered in good focus in the photograph represented by zone 504 being the interior of the trapezoid which lies between side 504b and side 504a). Similarly, previous coverage zone 510 is in the shape of a trapezoid and includes far focal side 510a and near focal side 510b (with the area covered in good focus in the photograph represented by zone 510 being the interior of the trapezoid which lies between side 510b and side 510a). It is noted that coverage zones 504 and 510 reflect distinctly different depths of focus, which is because the focus settings were different as between the photographs corresponding to these two coverage zones.

The past coverage zones 504, 506, 510, 512 also reflect various lens angles as shown by the opposing, non-parallel peripheral sides of these trapezoids.

Process 300a permits, but does not necessarily require, the display of past coverage zones 504, 506, 510, but it does typically provide for the display of the current coverage zone 508 in various embodiments, which will now be discussed. Coverage zone 508 includes: far focus side 508a; near focus side 508b; camera placement point 508c; and frame edge sides (or peripheral sides) 508d. In this example, the coverage zone is determined by the following photographic settings: (i) camera placement (this determines point 508c); (ii) camera angular orientation in the horizontal plane (this determines that triangle 508 is basically in the six o'clock position with respect to point 508c); (iii) lens angle (this determines the angle between peripheral sides 508d); and (iv) focus settings (this determines sides 508a,b). In this embodiment, the coverage zone does not account for other photographic settings, such as: (i) camera tilt with respect to the horizontal plane; and (ii) obstacle(s) blocking the camera's viewing vector. Other embodiments may display the coverage zone differently in order to account for these, and/or other variables, that relate to what an observer will actually see (and/or see clearly) in a photograph.

Figure 4B:
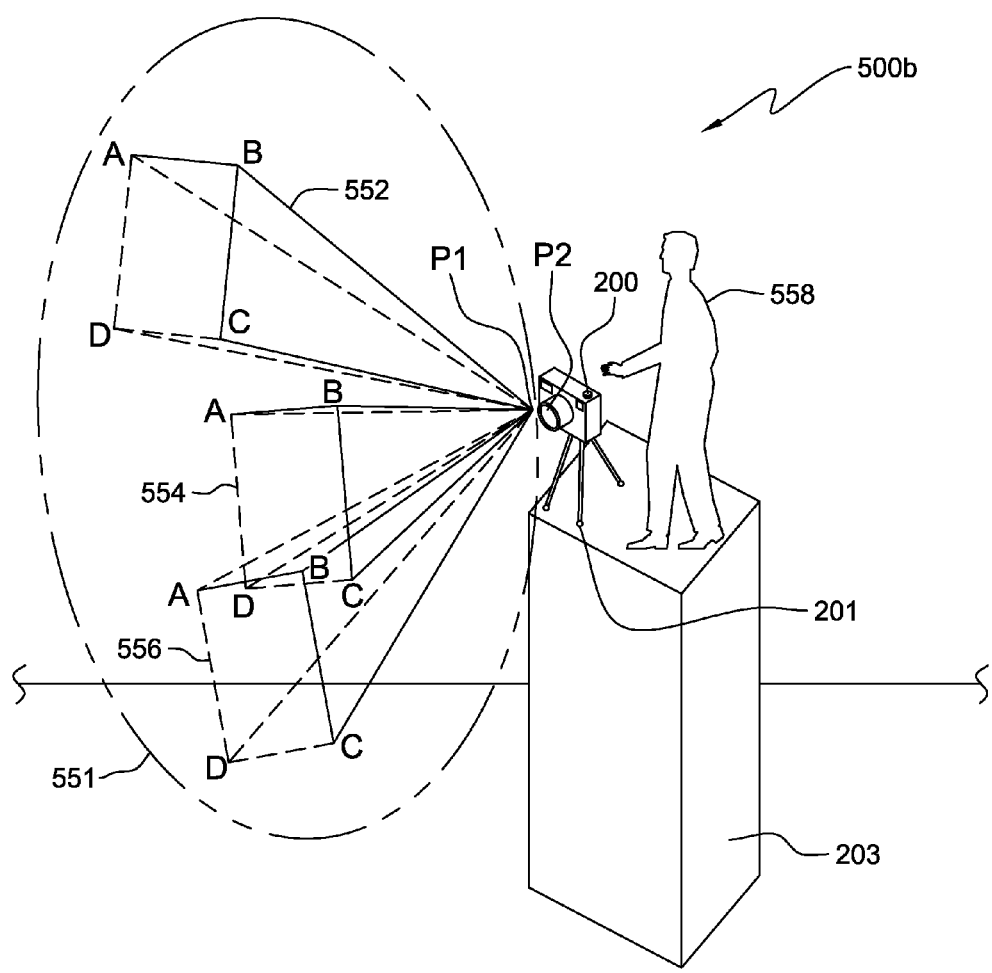
FIG. 4B is a perspective view of a photographer using the first embodiment system in the field, with the view including three dimensional coverage zones according to the present invention.

FIG. 4B is a view 500b of a photographer 558 using smart phone 200 on tripod 201. View 500b helps illustrate the concept of three dimensional coverage zones. View 500b includes: past three dimensional coverage zones 552, 554, 556. These three dimensional coverage zones are shown to the photographer on the touch screen display of smart phone 200, e.g., display 212 (FIG. 1).

In some embodiments, the view in the display of the smart phone may actually show, as background data, what is shown in view 500b of FIG. 4B, including photographer 558, tripod 201; and plateau 203. In this kind of embodiment, the background data may be a current literal image of a real world location. However, this kind of embodiment, with this current literal image of a real world location that shows the photographer and camera tends to be relatively costly and/or cumbersome, because it requires a second camera (not shown) placed at a considerable distance from the photographer and her camera, where the second camera is aimed at the photographer and her camera. Therefore, alternative embodiments may use other types of background data, as discussed above, The three dimensional coverage zones 552, 554, and 556 in area 551 of view 500b can be used with any type of background data (two dimension or three dimensional), or even no background data at all. Also, the three dimensional coverage zones may remain as three dimensional coverage zones (as they are shown in area 551 of FIG. 4B), or they may be "projected" and "flattened" to become two dimensional representations similar to the trapezoids of FIG. 4A, discussed above.

Returning now to FIG. 2A, process 300a proceeds from step S311 to step S312, where the user makes a qualitative decision regarding the coverage zone of the photograph that is about to be taken, which may be based on the display of the current coverage zone. If the displayed coverage zone is not acceptable or a different coverage zone is desired, the process returns to step S304, where photograph settings are adjusted to change the coverage zone.

Process 300a will automatically change coverage zone 508 in real-time as the photographic settings change when processing loops back to step S304. For example, if the photographer walks 5 feet to her right hand side while aiming her smart phone camera, then process 300a will move point 508c some scaled distance to the left in display 500a. This allows the photographer to know her coverage zone as she sets up a shot and before she actually takes the shot. This is a powerfully advantageous feature in at least some embodiments of the present invention that show a coverage zone for the "current" photo. If the photographer changes the lens angle (for example, by using a zoom feature built into the smart phone camera), then process 300a will move peripheral sides 508d in real time to reflect that adjustment. If the photographer changes the focus setting(s), then process 300a will move sides 508a,b to reflect those changes. If the photographer pivots the camera, or adjusts a tripod upon which the smart phone camera is mounted, then process 300a will change the location of triangle 508, within the display, to reflect those adjustments, too.

Step S312 allows for an iterative process to define the desired photograph coverage in anticipation of taking the current photograph. This process preferably operates in real-time (although it should be understood that "real-time" here may be subject to some latencies or other time delays so long as the delays are not so long as to prevent the photographer from using the "current" photo coverage zone feature of some embodiments of the present invention). For example, the photographer may rely on a laptop computer system to display the current photograph coverage zone. Although it is not necessarily preferred, in some embodiments the user may even manually enter camera settings (for example, GPS coordinates, camera vector headings, etc.) into a computer that is separate from, and not even in data communication with, her camera.

If the coverage zone displayed in step S312 is deemed appropriate by the photographer, then process 300a proceeds to step S314, where the photograph is taken or the video footage is recorded (for example, by having the photographer press a dedicated "shoot" button (not shown in the Figures) that is built into the camera.

When the photograph is taken, process 300a proceeds to step S316, where receive indication that current photograph is taken module 416 receives an indication that the "current" photograph has actually been taken. In some embodiments: (i) the representation of the "current" coverage zone in the display will disappear at step S316; or (ii) the representation of the "current" coverage zone in the display will change in form or formatting in some way at step S316 in order to indicate that the coverage zone is no longer a "current" coverage zone (that is photo not yet taken), but, rather is now a "past" coverage zone.

Process 300a proceeds to step S318, where store coverage zone for new photograph module 418a stores coverage zone data for the new photograph in coverage zone database 418b. The process may return to step 304 if another photograph is to be taken. Coverage zone storage in the coverage zone database enables additional functionality as can be appreciated from displayed coverage zones 504, 506, 510, 512 discussed above. Storing the new photograph coverage zone data includes storage of the photograph settings because these settings may be later used (for example, as metadata in image files corresponding to the photograph) and/or displayed to the photographer.

Figure 2B:
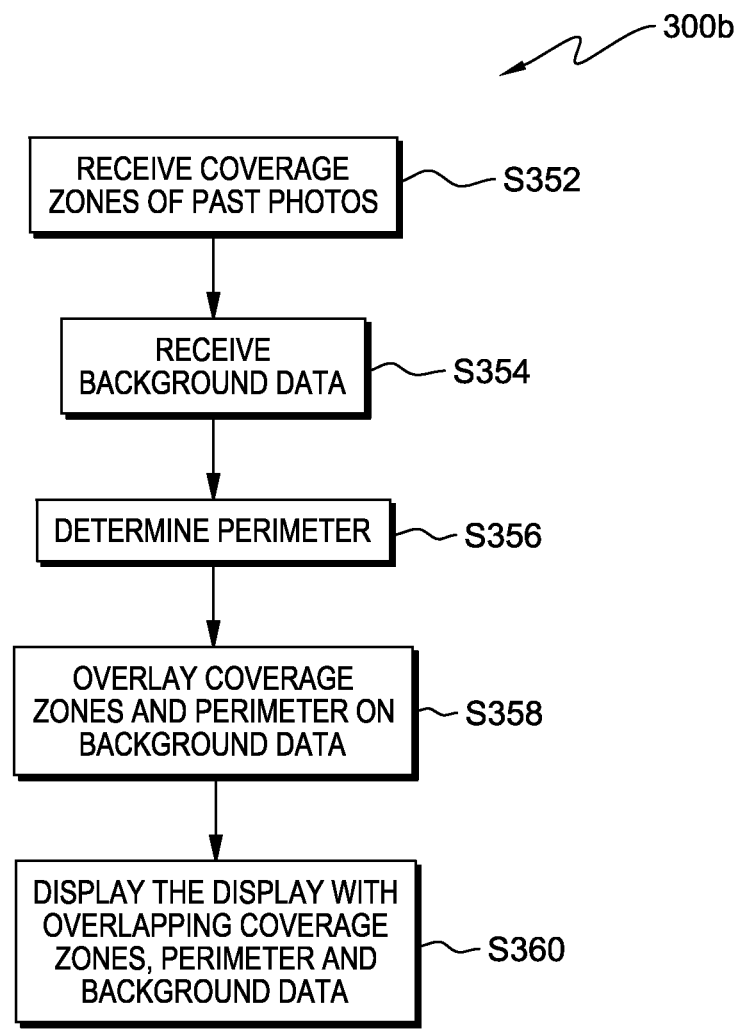
FIG. 2B is a flowchart showing a second process according to an embodiment of the present invention.

FIG. 2B is a flowchart depicting process 300b according to an embodiment of the present invention. While process 300a focuses on the current coverage zone, process 300b focuses more on past coverage zones corresponding to already-existing photographs. Some embodiments of the present invention: (i) can be used in both processes 300a and 300b; and (ii) will do processes 300a and 300b at the same time to generate a single view on a single display. Generally speaking, FIG. 300b is a process for displaying an aggregate coverage zone (see definitions sub-section below of this DETAILED DESCRIPTION section).

The various steps of process 300b will be discussed herein below. However, additional aspects of FIG. 4B will first be described in order to provide background information for the understanding of process 300b. In FIG. 4B, the current coverage zone is not shown, which is immediately apparent since coverage zones 552, 554, and 556 converge on camera point P1, but the camera is shown located a short distance away, at camera point P2. In FIG. 4B, the photographer has turned off display of the current coverage zone until she moves the camera to camera point P2, at which time she will again display the current coverage zone and consider whether the location permits covering an area not covered by the shots previously taken from the vantage of camera point P1, which may at that time be concurrently displayed as past coverage zones 552, 554 and 556. That is, at camera point P2 she will use the display of the current coverage zone (not shown in FIG. 4B) to help pivot the camera in the horizontal plane and tilt the camera in a vertical plane so that the current coverage zone does not much overlap the past coverage zones 552, 554 and 556. This enables her to build a multiple shot panoramic view where the shots are all taken from camera points nearby one another. This is just one illustrative way that the coverage zone representations of some embodiments of the present invention can help photographers accomplish common photographic objectives that are currently accomplished by "eyeballing" or on an ad hoc basis.

Process 300b begins at step S352, where module 454 (see FIG. 3) retrieves the coverage zones of the specified photographs from coverage zone database 418b (see FIG. 3). The specified photographs may be selected in many ways including: (i) by date/time range; (ii) from thumbnails of photographs in memory; (iii) by geographic location, (iv) by direction within a geographic location; and (v) from a previously displayed set of coverage zones. Coverage zones are established by photograph settings at the time the photograph was taken. When coverage zones are retrieved, all of the photograph settings metadata is included. The coverage zones may be stored in database 418b as: (i) a graphic (for example, a flat triangle embedded and intermingled with a symbolic map of which the triangle forms an integral part); (ii) a set of points, or a set of equation(s) for generating a set of points representing a coverage zone; and/or (iii) camera settings data sufficient to generate a coverage zone.

Process 300b proceeds to step S354, where background module 406 receives background data for the specified coverage zones. As discussed above, background data may be stored in coverage zone database 418b or otherwise stored in persistent storage 210. As needed, new background data may be provided to the background data module by viewfinder image program 245 and/or by GPS and maps software 240.

The background data for the various photographs at the same location may not match in date, scale, or appearance, but the locations of each photograph are based on common global coordinates. Where the coordinates are stored in various units of measure, mod 406 translates the background data for a set of photographs, as needed, so that the location data is uniformly applied to the background data of choice. In that way, mod 406 receives a single set of background data for multiple photographs taken on different dates and times.

Process 300b proceeds to step S356, where module 456 applies a perimeter determination algorithm to coverage zone data to determine the overall coverage zone, or aggregate coverage zone, of the set of photographs. Overall coverage zones may be determined on the basis of one or more of the surfaces of interest discussed above. Screenshot 500c shows one embodiment of an overall coverage zone based on multiple overlaid coverage zones (see FIG. 4C). Coverage zone 570 is based on far focus surfaces 572.

Process 300b proceeds to step S358, where overlay coverage zones on background data module 410 overlays the selected coverage zones onto a common background, such as a symbolic map, and overlays an overall coverage zone based on a perimeter determination algorithm. It should be understood that perimeter determination is not dependent on background data, however, background data may influence decision making when the perimeter is laid over the background data. The user may elect not to display background data in the displayed image.

Figure 4C:
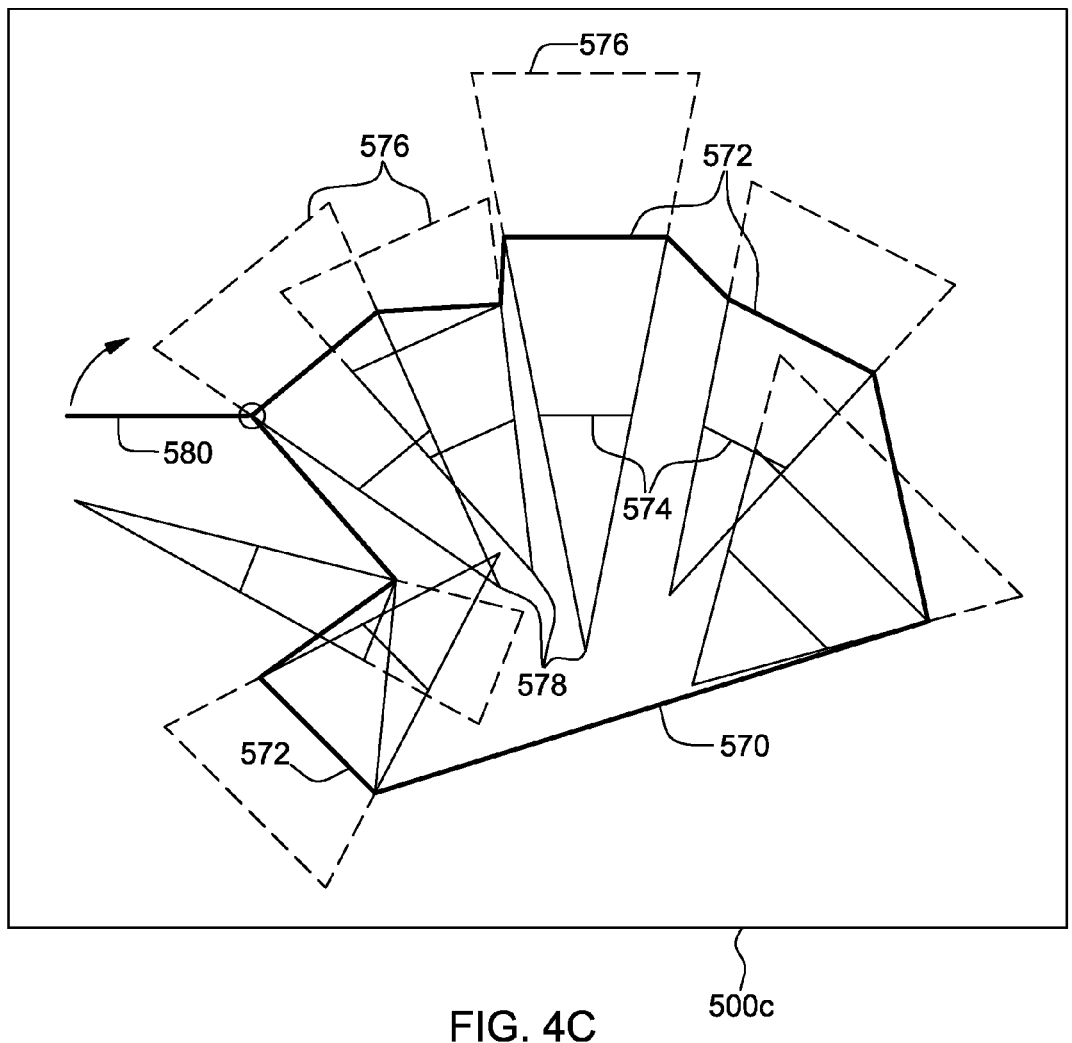
FIG. 4C is a second screenshot, generated by the first embodiment smart phone system, depicting a coverage zone for multiple photographs.

Process 300b proceeds to step S360, where enhanced display module 411 displays the background data with overlaid selected coverage zones and a perimeter, or overall coverage zone. FIG. 4C is a third screenshot 500c generated by smart phone system 102, depicting an overall coverage zone for multiple photographs, the screenshot including: overall coverage zone 570; far focus surfaces 572; foreground focus surfaces 574; hyperfocal surfaces 576; camera placements 578, and reference line 580.

Overall coverage zones may be displayed in a variety of ways. In one embodiment, the overall coverage zone is the closest elliptical approximation to the actual zone. In other embodiments the zone is circular, semi-circular, rectangular, or hexagonal. In another embodiment, the overall coverage zone is sketched to closely match the extents of the far focus surfaces, as shown in FIG. 4C.

More than one type of overall coverage zone may be displayed at one time. Where a geometric approximation of an overall coverage zone is display along with a closely sketched coverage zone, any space within the approximate zone, but outside of the closely sketched zone may indicate to the photographer that additional photographs should be taken in that area.

It may also be useful to overlay a target coverage zone onto a map before photographs are taken. In that way, the photographer is able to tune his photo shoot to match the desired or target coverage zone.

III. FURTHER COMMENTS AND/OR EMBODIMENT(S)

Modern digital cameras now come equipped with numerous features. Some are enabled by the addition of technologies not previously associated with photography, such as global positioning system (GPS) units, and compasses. These functions are also available as add-ons or off-camera applications. The inclusion of GPS has spawned some features that allow a user to identify where a picture was taken by juxtaposing it upon a geographical map. While this capability is interesting and useful later as a record of where the photos were taken, the present disclosure extends these capabilities to help the photographer plan and execute a photo session with considerable additional awareness of the details and coverage of their photographs.

Some embodiments of the present invention combine location information with camera information to provide a number of useful capabilities to the photographer before, during, and after a picture is made. These capabilities include the ability to see and/or share: (i) real-time map information about a particular photo; (ii) real-time map information about the coverage of a set of photographs in a "shoot" and/or at a location (see FIG. 4A); and (iii) real-time visualizations for several photographic practices to help the photographer create better photos, including: (a) hyperfocal distance, (b) focus-stacking, (c) bracketing (exposure, white balance, and shutter-speed), and (d) high dynamic range.

Some embodiments of the present invention combine real-time camera information and geographic information to create additional interfaces that help one or more photographers optimize both individual photos and sets of photos. Real-time camera information includes: (i) orientation, (ii) angle, (iii) heading, (iv) focal length; (v) aperture; (vi) exposure length; (vii) ISO setting; (viii) white balance; (ix) bracketing; (x) flash; (xi) focus distance; (xii) depth of field;

(xiii) date; (ix) time; and (x) hyperfocal distance. Geographic information includes: (i) latitude; (ii) longitude; and (iii) altitude.

The combined information may be displayed in one or more displays as they relate to current location. This allows the photographer(s) to ascertain coverage and effects of each single shot as well as overall coverage and settings. Such displays may be camera-perspective views (see FIG. 4B), overhead views of 2D or 3D maps, and so forth. Displays may be in-camera or on one or more associated peripheral devices, such as tablets and laptops. The real-time display: (i) helps the user to plan shots before taking them; (ii) projects the information by individual shot or in aggregate as photographs are taken; and/or (iii) includes historical information from the current photographer(s) or others.

Some embodiments of the invention work in: (i) two dimensions (width and depth); (ii) three dimensions (width, depth, and angle of height); and (iii) four dimensions (width, depth, angle of height, and time).

Some embodiments of the present invention provide an extended, real-time mapping capability offering numerous benefits for photographers and others before, during, and after a picture is made. By seeing the effects of individual photos and the coverage of the photos in a shoot, the user improves her ability to: (i) plan; (ii) compose; (iii) execute; (iv) document; and (v) share her work. Most aspects described herein are applicable to video as well.

Some embodiments of the present invention include a camera having a GPS unit and/or a compass or access, for example, access via a network, to the information provided by such components.

When a picture is taken, some embodiments of the present invention record information including: (i) the latitude of the location; (ii) the longitude of the location; (iii) the direction the camera faced at the time of the photograph; (iv) the camera's focal length; and (v) the camera's zoom settings. This information may permit calculation of the distance over which objects are in-focus.

In some embodiments, knowledge of the image sensor and lens and the focal length and zoom settings, a triangular region is established. For instance, for a ¼" CCD imaging sensor, using a focal length setting of 5.6 mm, and zoomed to a width that will encompass an image 20 feet in width, the distance from the lens to the in-focus elements of the picture will be 35 feet (note: all these calculations are approximate, used for illustration). If the point of the triangle touching the focal plane is labeled A, the height of the triangle can be calculated to be 35 feet, and the base is 20 feet. Setting the base at a right angle to the height, centered along the 20 foot width, allows calculation of points B and C on either side of point A.

Each time a photograph is taken, a triangular region ("shot cone") can be calculated, indicating the approximate geographic region 'covered' by that photograph. Under normal use, the shot cone of any photograph is likely to overlap with the area of one or more other photographs. A set of such overlapping shot cones define a larger area, or areas, because a set is unlikely to constitute a single, contiguous, two-dimensional space. An outer perimeter for the area, or areas, can be determined (see FIG. 4C). The outer perimeter indicates the outer boundary of the geographic region where the camera (or a set of multiple cameras) was used during a specified time period (a time period which can include the life of the camera). The degree of overlap can be indicated by using colors whose saturation indicates those parts of regions having higher degrees of overlap.

Referring again to FIG. 4C, one embodiment of a process to determine an outer perimeter of a set of photographs includes: (i) select all planes 572 associated with the selected perimeter; (ii) select all vertices 578 associated with the selected planes, that are not enclosed within a shot cone; (iii) from this set of vertices, select the leftmost vertex and label it 'A', and remove it from the set of available vertices; (iv) from the vertex 'A', extend a line at an angle of zero degrees (i.e., extend a line due left, reference line 580); (v) from an initial angle of zero degrees from the starting position of this reference line, pivot the reference line using the initial vertex as the pivot point, to increase the angle between the reference line and its initial position, and mark the first vertex that the reference line passes through, where the angle is greater than zero; (vi) continue to increase the angle of the reference line and mark the second vertex that the reference line passes through; (vii) if the distance from 'A' to the second marked vertex is shorter than the distance from the first marked vertex, draw a reference line from 'A' to the second marked vertex as vertex 'B', else, draw a reference line from 'A' to the first marked vertex as 'B'; and (viii) re-label the vertex 'B' as 'A' and remove it from the set of available vertices, then repeat steps (iv) to (viii), until a reference line is drawn to the initial vertex.

Some embodiments can calculate the hyperfocal distance given particular sensor size, lens, focal length, and aperture. In some embodiments of this invention, the camera can then additionally show on the map: (i) where the hyperfocal point is, or was, in relation to the shot cone; (ii) whether the shot was taken with focus set at that point; and (iii) which parts of the shot cone are in focus based on the focus point.

Additionally, height and angle information (relative to the ground) can be utilized. Some embodiments include an airplane-like "artificial horizon". With this added data, the map may present three dimensional data. For example, in a camera-perspective view, the "camera point" is shown relative to the ground and the triangle is shown cone-like showing how much the camera was pointed up or down when a photo was taken.

Further, the display can show and record; (i) whether, and which, multiple shots were made from the same place at different focal lengths (focus stacking); and (ii) whether, and which, multiple shots were made from the same place at different exposures (bracketing/high dynamic range). Any, or all, of these aspects can be included in the visual depictions of the scenes offered by embodiments of this invention.

The user can identify and name multiple "regions", that is: sets of photos displayed according to their geographic origin. The set of photos used to create a distinct region can be determined in various ways, such as (i) time proximity, or (ii) all photos whose "camera point" lies within some specified region.

The outermost perimeter can also be calculated in various ways including; (i) a perimeter line can be drawn which follows the outermost point, at every direction of the compass; (ii) a perimeter can be drawn from an innermost point calculated using either (a) all the "camera points" within the set of shot cones or (b) all "camera points" for each shot; (iii) a perimeter can be drawn from the hyperfocal distance for each shot; or (iv) a perimeter can be drawn from some other calculated point based upon each shot.

As shown in FIG. 4B, when user 558 is preparing to take a photograph, the display may show a shot cone (and other information) of a current photo that is about to be taken as an overlay atop the mapping of all previous photos taken for a specified time period or geographic region. Shot cones

552, 554, and 556, representing the previous photos, may be distinguished from the shot cone (not shown) of the current photo by: (i) color, (ii) contrast, (iii) flashing cone; and/or (iv) other distinguishing graphics or graphic actions. This provides the user with a perspective of how the photo that is about to be taken fits into the context of the other pictures in the set.

A user may select a picture from a set by, for instance, touching its triangular region, and then selecting the option to "match," which will allow the user to re-create the selected photo. After the selection of the "match" option, the user sees her current position relative to the selected photo. The user may then move toward the location of the selected photo: (i) tracking their progress visually, and/or (ii) listening to an audio signal that cues and directs them toward the point where the original photo was taken. Upon arrival at the site of the original photo, and while preparing to take a photo, the display shows an overlay of the photo about to be taken, and allows the user to align the current triangular area with that of the original photo. Camera settings may be set automatically using data from the original photo. The focusing and zoom can be matched as well by aligning the base of the triangle for the new photo with that of the old. When a match is attained, the user is signaled of the event through: (i) the display; and/or (ii) an audio signal.

Some embodiments of the present invention include a photomap display that indicates the sequence of the photo shoot. In this embodiment, the photomap: (i) highlights each triangle (or cone, for 3D displays) to indicate the chronological order the photo was taken; and/or (ii) each triangular region is numbered to show chronological order.

Some embodiments of the present invention include a feature that allows the user to filter the map to show photos taken: (i) before or after a specified time; (ii) in a direction between due north and due east; or (iii) where the depth of focal plane is less than a specified distance (e.g., all "close-ups"), etc. Additionally, the "ordering" feature may be combined with filtering capability to show order within (i) a filtered set or (ii) the overall set of photos.

In some embodiments, any photomaps created can be transferred from the original camera and input to another camera to allow another photographer or better equipment to traverse and, perhaps, re-create or approximate a prior photographing experience.

A recent advance in photography is the ability for a person to take a picture first, then adjust the focus. Focusing can be performed later, using software where the photo: (i) captures the entire light field and/or (ii) takes a series of photos with varying depth of fields in quick succession, and then combines them all into a single image.

For cases where multiple, or infinite, focus planes exist in a single photograph or image, shot cones can still be constructed and displayed, but the display may show the closest possible focus and/or the farthest possible focus.

There also exists the ability to change the camera's apparent location and direction, i.e., after the picture is taken, the software can make it appear that the picture was taken one foot to the right, angled a few degrees to the left, from where it was actually taken. The coverage zone may be adjusted to represent the entire coverage zone even though a given photograph may not show the entire coverage zone.

In some embodiments of the present invention, a method of creating a display relating to photography done by a camera includes determining the plurality of past photographs by a least one of the following: (i) a time range in reference to the time the plurality of photographs were taken; (ii) a geographic region within which the plurality of photographs were taken; and (iii) camera placement criteria.

Please note that actions described herein, including in the flow charts and claims, may be performed in the recited sequence, but, unless clearly indicated otherwise, may be performed in a different sequence.

IV. DEFINITIONS

The following paragraphs provide definitions for certain term(s) used in this document:

And/or: non-exclusive or; for example, A and/or B means that: (i) A is true and B is false; or (ii) A is false and B is true; or (iii) A and B are both true.

User: includes, but is not necessarily limited to, the following: (i) a single individual human; (ii) an artificial intelligence entity with sufficient intelligence to act as a user; and/or (iii) a group of related users.

Image surface: a surface representing a user defined distance from the camera placement; the image surface is an artificial construct providing flexibility to the user.

Symbolic map: symbolic map are maps that use symbolic representations (for example, colors, lines, icons, etc.) to represent geographic area(s) and/or space(s); these symbolic representations may or may not attempt to closely emulate what an observer of the area(s) or space(s) would see—in other words, the symbols may or may not attempt to emulate a satellite photo or photo from a non-satellite perspective; a typical road map in a conventional atlas book would be one example of a symbolic map, and a globe would be another example.

Coverage zone: any representation that indicates (with any degree of accuracy or precision) the space (that is area(s) and/or volume(s)) that are or potentially could be meaningfully shown in a photograph or video segment; there are many possible types of "coverage zones" as will be readily apparent from the discussion, above; it is noted that real world things shown in a photo or video segment itself cannot be considered as a "coverage zone" because a "coverage zone" must be an artificial representation independent of objects and other physical things that exist in actual space that has been (or may be) photographed; a fixed coverage zone is one that is fully determined by camera placement, without regard to other camera settings, such as focus or zoom angle.

Aggregate coverage zone: a combination of coverage zones for at least two existing and/or potential photographs and/or video segments.

Photography: includes both still photography and videography.

Image: includes still photographic images and video images.

What is claimed is:

1. A method of creating a display relating to photography done by a camera, the method comprising:
   determining a first coverage zone for a current photograph and a plurality of past coverage zones for a plurality of past photographs; and
   generating a data set corresponding to the display, with the display including:
     at least a portion of the first coverage zone and at least a portion of the plurality of past coverage zones; and
     a background display showing the locations where the past photographs were taken and where the current photograph is about to be taken;
   wherein:
     the first coverage zone represents a region of space that will be shown in the current photograph if it were taken;
     the first coverage zone is at least partially defined by focus attributes of the camera; and
     at least the determining and the generating steps are performed by at least one processor;

the method further comprising:
determining the plurality of past photographs by selecting at least a time range in reference to the time the plurality of past photographs were taken, wherein the plurality of past coverage zones are determined based upon corresponding ones of the plurality of past photographs included in the selected time range; and
indicating in the display a degree of overlap of the plurality of past coverage zones by using colors whose saturation indicates those parts of the past coverage zones having higher degrees of overlap.

2. The method of claim 1 further comprising:
displaying the display on a display device.

3. The method of claim 2 wherein the display device is a touch screen on a smart phone.

4. The method of claim 1 wherein the first coverage zone is at least partially defined by zoom attributes.

5. The method of claim 1 further comprising:
generating an aggregate coverage zone including the first coverage zone and the plurality of past coverage zones.

6. The method of claim 5 further comprising:
generating a perimeter corresponding to limits of the aggregate coverage zone.

7. The method of claim 5, wherein the determining the plurality of past photographs further comprises at least one of the following: determining the plurality of past photographs by a geographic region within which the plurality of photographs were taken, and determining the plurality of past photographs by camera placement criteria.

8. The method of claim 1, wherein the background display is in at least one of the following forms: a past literal image of a real-world location according to a top down orthographic view, a past literal image of a real-world location according to a perspective view, a present literal image of a real-world location according to a top down orthographic view, and a present literal image of a real-world location according to a perspective view.

9. The method of claim 1, wherein the background display is a symbolic map.

10. A system for creating a display relating to photography done by a camera, the system comprising:
at least one processor; and
a software storage device;
wherein:
the at least one processor is structured, programmed and/or connected to run software stored in the software storage device;
the software storage device has stored thereon an enhanced display program; and
the enhanced display program is programmed to:
determine a first coverage zone for a current photograph and a plurality of past coverage zones for a plurality of past photographs; and
generate a data set corresponding to the display, with the display including:
at least a portion of the first coverage zone and at least a portion of the plurality of past coverage zones; and
a background display showing the locations where the past photographs were taken and where the current photograph is about to be taken;
wherein:
the first coverage zone represents a region of space that will be shown in the current photograph if it were taken; and
the first coverage zone is at least partially defined by focus attributes of the camera;
the enhanced display program being further programmed to:
determine the plurality of past photographs by selecting at least a time range in reference to the time the plurality of past photographs were taken, wherein the plurality of past coverage zones are determined based upon corresponding ones of the plurality of past photographs included in the selected time range; and
indicate in the display a degree of overlap of the plurality of past coverage zones by using colors whose saturation indicates those parts of the past coverage zones having higher degrees of overlap.

11. The system of claim 10 wherein the enhanced display program is further programmed to:
display the display on a display device.

12. A computer program product for creating a display relating to photography done by a camera, wherein the computer program product comprises a non-transitory computer readable storage medium having stored thereon:
a first determining instruction set programmed to determine a first coverage zone for a current photograph and a plurality of past coverage zones for a plurality of past photographs; and
a generating instruction set programmed to generate a data set corresponding to the display, with the display including:
at least a portion of the first coverage zone and at least a portion of the plurality of past coverage zones; and
a background display showing the locations where the past photographs were taken and where the current photograph is about to be taken;
wherein:
the first coverage zone represents a region of space that will be shown in the current photograph if it were taken; and
the first coverage zone is at least partially defined by focus attributes of the camera;
the computer readable storage medium further having stored thereon:
a second determining instruction set programmed to determine the plurality of past photographs by selecting at least a time range in reference to the time the plurality of past photographs were taken, wherein the plurality of past coverage zones are determined based upon corresponding ones of the plurality of past photographs included in the selected time range; and
an indicating instruction set programmed to indicate in the display a degree of overlap of the plurality of past coverage zones by using colors whose saturation indicates those parts of the past coverage zones having higher degrees of overlap.

13. The computer program product of claim 12 wherein the display further includes:
at least a portion of an aggregate coverage zone, the aggregate coverage zone including the first coverage zone and the plurality of past coverage zones.

14. The computer program product of claim 13 wherein the computer readable storage medium has further stored thereon:
a displaying instruction set programmed to display at least a portion of the aggregate coverage zone on a display device.

* * * * *